United States Patent
Wheaton

[11] 3,874,107
[45] Apr. 1, 1975

[54] FISHING ROD HOLDER AND SIGNAL DEVICE

[76] Inventor: Frank J. Wheaton, 2727 De Anza, San Diego, Calif. 92131

[22] Filed: June 19, 1974

[21] Appl. No.: 480,637

[52] U.S. Cl. .................................................. 43/17
[51] Int. Cl. ........................................... A01k 97/12
[58] Field of Search ...................................... 43/17

[56] References Cited
UNITED STATES PATENTS

| | | | |
|---|---|---|---|
| 2,909,860 | 10/1959 | Braun | 43/17 |
| 3,058,251 | 10/1962 | Brooks | 43/17 |
| 3,359,672 | 12/1967 | Schwartz et al. | 43/17 |
| 3,645,028 | 2/1972 | Rayburn | 43/17 |

*Primary Examiner*—Louis G. Mancene
*Assistant Examiner*—Daniel J. Leach

[57] ABSTRACT

A combined fishing rod holder and signal device includes a vertical support member which is driven into the ground. The support member is split into two portions and includes a movable bracket which attaches the two parts and allows them to be adjusted so that the height of the support member can be adjusted as desired. A movable receptacle is connected to the support member and is adapted to receive the handle of a fishing rod which is placed generally upright, parallel to the support. A guide member is disposed vertically above the receptacle and is adapted to co-act with the receptacle and position the handle of the fishing rod as required. A resilient member is pivoted to the support and at the upper extremity thereof, it is affixed to the guide member. A combination alarm and electric power means is connected to the support and the resilient member and a support member are both electrically conductive. A conductive detent is connected to the inner face of the resilient member and that detent is normally spaced from the support member. When a fish is hooked, it pulls on the line and in turn the detent is pulled into contact with the support to complete the circuit and activate the alarm.

12 Claims, 2 Drawing Figures

PATENTED APR 1 1975 3,874,107
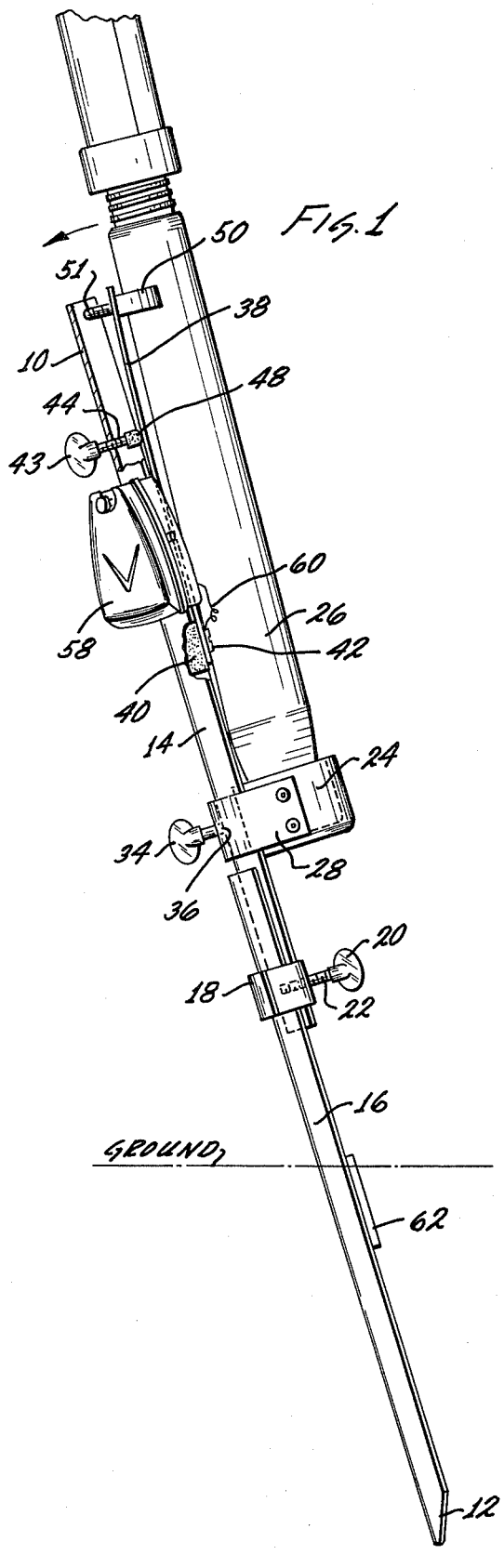
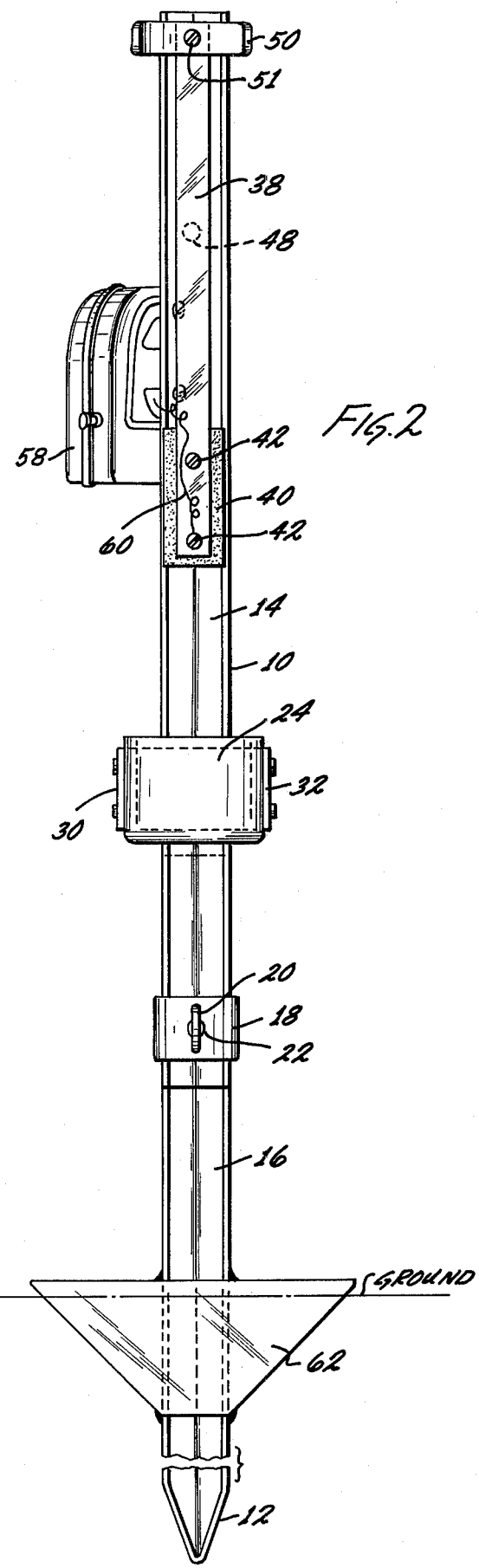

FISHING ROD HOLDER AND SIGNAL DEVICE

BACKGROUND OF THE INVENTION

This invention relates to fishing equipment and more particularly to an audible signal device intended to provide an audible signal in the event of a strike.

As the sport of fishing has become more popular, various devices to permit the fisherman to relax and even possibly to attend to other matters while his line is out in the water, have been devised. The ideal device permits the fisherman to cast his line and then leave the rod unattended only to be signalled when a strike is made, so that he may attend to the line and reel the fish in. Of the many devices, U.S. Pat. No. 3,156,997 to Smith illustrates a fish pole alarm in which the fish pole is received in a socket for pivotal movement about a pivot point. Pivotal movement, such as that caused by a fish on the line, causes the alarm to be activated through a button. The device is inserted into the ground through the use of a pointed rod.

Another device is illustrated in U.S. Pat. Nos. 3,560,969 and 3,285,360, respectively, which both disclose other configurations that incorporate a ground inserted rod for supporting both the fish pole, holder and a fish buzzer alarm.

In U.S. Pat. No. 3,058,250 to Thomas, the alarm is manually actuated and the device provides for ground insertion and a rod holder as well as the signalling function.

In U.S. Pat. Nos. 3,135,187, 3,053,003 and 2,608,784, the signalling device is attached to the rod and the signal is produced by movement of the line as distinct from movement of the rod.

All of these devices have proved reasonably effective in permitting the fisherman to divert his attention to other things while he is waiting for a strike. The present invention presents a superior mechanical configuration and is extremely reliable in that even the smallest strike will signal the line. The present invention is also unique in that it provides for various modes of adjustment and therefore can accommodate rods of varying size, shape or weight. It provides the further advantages of preventing the support or holder from pivoting about its own axis.

SUMMARY

A combined fishing rod holder and signal device includes a vertical support member which is driven into the ground. The support member is split into two portions and includes a movable bracket which attaches the two parts and allows them to be adjusted so that the height of the support member can be adjusted as desired. A movable receptacle is connected to the support member and is adapted to receive the handle of a fishing rod which is placed generally upright, parallel to the support. A guide member is disposed vertically above the receptacle and is adapted to co-act with the receptacle and position the handle of the fishing rod as required. A resilient member is pivoted to the support and at the upper extremity thereof, it is affixed to a guide member. A combination alarm and electric power means is connected to the support and the resilient member and a support member are both electrically conductive. A conductive detent is connected to the inner face of the resilient member and that detent is normally spaced from the support member. When a fish is hooked, it pulls on the line and in turn the handle is yanked. The resilient member is insulated from the support by an insulation insert which can be a wooden insert of pyramidal shape.

The holder includes an anchoring spike which is adapted to be forced into the ground and prevent rotational movement about the axis of the support member. The receptacle is adjustably bracketed to the support member to permit variable positioning along the length of the support member to accommodate rods of different handle sizes.

Further aspects of the holder include a split support member whose upper and lower sections are connected via an adjustable bracket so that the handle of a rod may be set at any of an infinite variety of selected positions. This simple feature is provided by having the lower section and the upper section in overlying relation and the lock is of a frictional type engagement.

The above and other aspects of the present invention will be apparent as the description continues and when read in conjunction with the drawings.

BRIEF DESCRIPTION OF THE DRAWINGS

FIG. 1 is a front elevational view of the present invention;

FIG. 2 is a side elevational view of the instant invention.

DETAILED DESCRIPTION OF THE DRAWINGS

The fishing rod holder embodying the present invention is characterized by an elongated support member 10 which has a pointed or spiked bottom 12. The support is to be driven into the ground to a depth of approximately 6 to 8 inches for secure support of the fishing rod. The support is shaped generally in the nature of an elongated channel or it can be considered to have a V-shaped cross-section. It is split into an upper 14 and lower 16 segments. Because of the configuration of this support, it is possible to assemble the two segments in overlying relation and at the same time have a substantial face-to-face contact of the two segments. This feature makes it convenient to provide a lock which basically secures the two segments by means of a frictional engagement. A bracket 18 wraps around the upper and lower segments 14, 16 and a set screw 20 is threaded into a hole 22 in the bracket 18 and its leading tip presses down on the crease of the upper segment 14. The action of the set screw on the crease and the interior of the bracket on the exterior face of the lower segment forces the interior of the lower segment and the exterior of the upper segment into a very tight frictional engagement. It should be evident that the support has been designed in this manner so as to permit a variable length so as to better accommodate fishing rods of numerous sizes. In other words, a different rod may be used for a particular type of fish and the instant invention makes it possible to utilize one holder for the various rods that may be used.

A cup or receptacle 24 is mounted on the upper segment 14 and is adapted to receive the butt end of the rod handle 26. That receptacle is designed to support and contain the rod handle and the bracket 28 makes it possible to move the receptacle up and down the upper segment so as to provide another means of adapting this holder for various sizes and shapes of fishing rods. The bracket 28 includes the arms 30, 32 which in the vicinity of the edges thereof are riveted to the receptacle. Another set screw 34 is received in an opening 36 and bears against the outer crease of the upper segment. The outer surface of the receptacle, in part, bears against the interior sides of the upper segment and the combination is effective to anchor the receptacle in any one of its various positions. While it is not illustrated, it is certainly possible to movably connect the receptacle to the lower segment. However, in this embodiment, it has been found convenient for the receptacle to be connected to the upper segment for the accommodation of a large number of different fishing rods handles.

Further up the upper segment, there is a resilient member, such as a leaf spring 38, which is connected to an insert 40 of electrical insulative characteristics. It has been found convenient to fabricate the insert from material such as wood. The insert is basically wedge shaped and adapted to mate with the interior surfaces of the upper segment; in other words, the insert has a similar triangular cross-section. The resilient member 38 is affixed to the insert 40 by means of a pair of screws 42. Intermediate the two ends of the resilient member 38 is a set screw 43 which is received in a hole 44 which is formed right through the crease of the upper member. A nipple 48 is placed on the tip of the set screw 44 and is active on the leaf spring 38. This arrangement permits the leaf spring 38 to be biased in different degrees away from the upper segment so as to permit the fisherman to adjust the holder so that the warning will sound only when there is a proper or desired tension in the fishing rod. In other words, the further the leaf spring 38 is biased in the upper segment 14, the more force the fish will have to exert on the pole to cause the alarm to be sounded. At the uppermost end of the leaf spring 38, there is fixed a semicircular bracket 50 which functions basically as a guide member and co-acts with the receptacle to maintain the fishing rod handle in its proper disposition. That guide bracket is affixed to the leaf spring 38 by means of a screw 51 of electrically conductive properties threadedly received in aligned holes in the guide member and leaf spring respectively. A combination alarm and power source 58 of a conventional nature may be affixed at any convenient position along either the upper or lower segments 14, 16. The hot lead 60 of the power source 58 is connected to one of the screws 42. Since the upper segment 14 is electrically conductive when there is sufficient flexure in the fishing rod to bend the resilient member such that the screw 51 contacts the crease of the upper segment 14, the circuit to the power source is completed and the alarm will sound. An alarm may be chosen which is piercing enough to alert a fisherman who might have turned his attention to other matters and he can retrieve the fishing rod from the holder and reel his strike in.

Previous experience with fishing rod holders has shown that upon occasion a fish with unusual manipulative ability will pull the rod so as to cause the holder to pivot about its own axis and consequently weaken its anchoring in the ground. To this end, the instant invention has been provided with a spike 62 which may be welded or soldered onto the lower segment 16. That spike includes rather relatively extensive wings and when the support 10 is driven into the ground, it is driven in deep enough so that the spike also enters the ground. The wings, therefore, inhibit pivoting of the support and consequently there is very little chance that an unusually strong fish will so weaken the anchoring of the support so that it will tip over. This feature in combination with those previously described permits the fisherman to divert his attention elsewhere with virtually complete security that he will be alerted to a strike and regardless of the size or strength of the fish, the strike will not be lost.

Many changes may be made in details of the instant invention, in the method and materials of fabrication, in the configuration and assemblage of the constituent elements, without departing from the spirit and scope of the appended claims, which changes are intended to be embraced therewithin.

I claim:

1. A combined fishing rod holder and signal device which comprises a vertical support member adapted to be anchored in the ground, a receptacle member adapted to support the lower portion of the handle of a fishing rod, said receptacle being affixed to said support at an intermediate point thereof, a guide member disposed vertically above said receptacle and adapted to co-act with said receptacle and position the handle of the fishing rod, a resilient member pivoted to said support member and at the upper extremity thereof is affixed said guide member, combination alarm and electric power means connected to said support, said resilient member being electrically conductive and in electrical connection with said electric supply, and said support being electrically conductive, a conductive detent connected to said guide member and also connected to said resilient member, said detent normally spaced from said support member, said rod holder anchored in the ground such that said receptacle, resilient and guide members face away from the body of water, whereby when a fish is hooked and its struggling pulls on the fishing rod, said resilient member bends and said detent contacts said support completing a circuit to said alarm, which alarm emits an audible signal.

2. In the combination of claim 1 said resilient member is insulated from said support member by an insulation insert.

3. In the combination of claim 1 an anchoring spike adapted to be forced into the ground thereby to prevent said support from rotational movement about the axis of said support member.

4. In the combination of claim 1 said spike is affixed to the lower part of said support member.

5. In the combination of claim 1 said receptacle is adjustably bracketed to said support member to permit variable positioning along the length of said support member.

6. In the combination of claim 1 said anchoring spike is adjustably bracketed to said support member to permit variable positioning along the length of said support member.

7. In the combination of claim 1 said support member is split into upper and lower sections, an adjustable bracket fastening said sections at any of an infinate variety of selected positions.

8. In the combination of claim 7 said upper and lower sections are fastened in overlying relation and said bracket is active to lock the overlying portions in frictional engagement.

9. In the combination of claim 1 biasing member movably connected to said support member and active on said resilient member to bias said member to a selected orientation.

10. In the combination of claim 1 said resilient member is insulated from said support member by an insulation insert, an anchoring spike adapted to be forced into the ground thereby to prevent said support from rotational movement about the axis of said support member, said receptacle is adjustably bracketed to said support member to permit variable positioning along the length of said support member, said anchoring spike is adjustably bracketed to said support member to permit variable positioning along the length of said support member, and said support member is split into upper and lower sections, an adjustable bracket fastening said sections at any of an infinite variety of selected positions.

11. In combination of claim 10 said spike is affixed to the lower part of said support member, said upper and lower sections are fastened in overlying relation and said bracket is active to lock the overlying portions in frictional engagement, and a biasing member movably connected to said support member and active on said resilient member to bias said member to a selected orientation.

12. In the combination of claim 1 said support member is an elongate channel comprising flat sides joined along a common edge thereof.

* * * * *